United States Patent Office 3,457,190
Patented July 22, 1969

3,457,190
HYDROCARBON CONVERSION CATALYST
Kenneth D. Vesely, La Grange Park, Ill., assignor to Universal Oil Products Company, Des Plaines, Ill., a corporation of Delaware
No Drawing. Filed Mar. 13, 1967, Ser. No. 622,403
Int. Cl. B01j 11/40
U.S. Cl. 252—451    6 Claims

ABSTRACT OF THE DISCLOSURE

A catalyst manufacturing process. The catalyst is a faujasite dispersed in an amorphous silica matrix. The catalyst is manufactured by adding the faujasite together with the mother liquor from which it was precipitated to a silica sol and then effecting gelation.

Background of the invention

For many years heavy petroleum hydrocarbon feed stocks boiling in excess of about 400° F. have been converted to lower boiling hydrocarbons in the motor fuel boiling range by heating them at a temperature in the 600° F.–1100° F. range in contact with an amorphous silica-alumina catalyst. While other silica composites e.g., silica-zirconia, silica-magnesia, etc. have been known to catalyze the cracking reaction, the silica-alumina composite has been by far the most widely accepted catalyst in the industry. More recently, improved catalysts have been prepared by the inclusion of certain finely divided crystalline alumino-silicates, particularly the synthetically prepared faujasites, within the amorphous silica-alumina matrix.

While an amorphous silica has never been considered to be competitive with an amorphous silica-alumina composite as a cracking catalyst, it has been observed that the inclusion of a faujasite in the silica matrix results in a catalyst comparable to or better than one whereby the faujasite is included in an amorphous silica-alumina matrix. This offers a number of advantages, not the least of which is the considerable reduction in the cost of catalyst manufacture.

The art discloses a number of methods applicable to the preparation of the catalyst herein contemplated, all of which require the recovery of the faujasite as a finished product prior to distribution thereof in a siliceous matrix. For example, it is the common practice to prepare the faujasite by the method whereby an appropriae mixture of oxides, or of materials whose composition can be completely represented os a mixture of the oxides $SiO_2$, $Al_2O_3$, $Na_2O$ and $H_2O$, is heated together in an aqueous solution with the formation of a faujasite. Preliminary to dispersing the faujasite in the siliceous matrix by prior art methods, it is considered essential that the faujasite be first separated from its mother liquor and water-washed until the water in equilibrium with the product is free of soluble salts and amorphous silica. Usually an alkali metal aluminate is used as a source of alumina and, together with an alkali metal hydroxide, as a source of alkali metal ions. The nature of the reaction requires that considerable excess of silica be employed, the excess being subsequently recovered in the mother liquor and discarded.

It is then an object of this invention to present a novel process for the manufacture of a catalytic composite comprising a faujasite dispersed in an amorphous silica matrix. It is a further object to present a novel method of dispersing a faujasite in an amorphous silica matrix whereby the faujasite is employed admixed with its mother liquor. It is still another object to utilize the mother liquor as a source of amorphous silica.

Summary of the invention

In one of its broad aspects, this invention embodies a process for the manufacture of a catalytic composite comprising a faujasite dispersed in an amorphous silica matrix, which process comprises (a) preparing a faujasite dispersed in its mother liquor, (b) rapidly dispersing the faujasite-mother liquor mixture in an acidified alkali metal silicate solution having a pH in excess of about 2.5, controlling the pH during the faujasite-mother liquor addition so as not to exceed about 4.5, the final pH of the mixture being from about 4.0 to about 4.5, and effecting gelation of the mixture (c) adjusting the pH of the resulting slurry to a pH of from about 5 to about 8 and aging the slurry for at least about 0.5 hour, (d) separating the resulting product and base-exchanging the same in contact with a solution containing an ion capable of replacing alkali metal ions and characterized by a pH in excess of about 4.5, (e) washing the base-exchanged product free of soluble matter and drying the resultant catalyst composite.

Other objects and embodiments of this invention will become apparent in the following detailed specification.

Pursuant to the process of this invention a faujasite is prepared and utilized in its mother liquor. The faujasite-mother liquor mixture herein contemplated may be prepared in any conventional or otherwise convenient manner. One preferred method comprises forming an aqueous solution of an alkali metal aluminate and an alkali metal hydroxide and adding said solution to an aqueous silica slurry. The alkali metal hydroxide is usually sodium hydroxide, and the alkali metal aluminate is usually sodium aluminate, a sodium aluminate comprising a $Na_2O/Al_2O_3$ molar ratio of about 1.2 being suitably employed. The resulting reaction mixture preferably comprises a $Na_2O/SiO_2$ molar ratio of at least about 0.3 and generally not in excess of about 0.7, and a $SiO_2/Al_2O_3$ molar ratio of from about 6 to 20, sufficient to yield a faujasite product characterized by a $SiO_2/Al_2O_3$ molar ratio of at least about 3. Preferably, the reaction mixture has a composition expressed in terms of oxide mole ratios as follows:

$SiO_2/Al_2O_3$ from 6 to 20

$Na_2O/SiO_2$ from 0.3 to 0.7

$H_2O/Na_2O$ from 25 to 60

In any case, faujasite is precipitated from the reaction mixture at a temperature of from about 65° F. to about 245° F. utilizing a closed vessel to avoid the loss of water. It is preferred to age the reaction mixture for from about 1 to about 24 hours or more at a temperature up to about 100° F. prior to heating at a higher temperature—usually about 212° F. By so doing, the desired faujasite product is obtained substantially free of other zeolitic material. After the preferred "cold age," the reaction mixture is heated as aforesaid to effect substantially complete precipitation of the faujasite product from its mother liquor.

The faujasite-mother liquor mixture is thereafter cooled and added to the acidic sodium silicate solution in an amount to insure a final catalyst composite comprising from about 1.0 to about 60 weight percent faujasite dispersed in a silica matrix, preferably from about 1.0 to about 10 weight percent. The faujasite dispersed in its mother liquor is a highly alkaline mixture. It is preferred to add the faujasite-mother liquor mixture to an acidic sodium silicate solution having a pH in the lower range, say from about 2.5 to about 3.5, such that the final pH of the reaction mixture is in the aforesaid range of from about 4.0 to about 4.5. The addition should be accomplished as rapidly as possible to avoid undue exposure of the faujasite to the more acidic conditions. The rate of addition is limited only by the efficiency with which the faujasite-mother liquor mixture is dispersed in the acidic sodium silicate solution. Should the alkaline mixture be added too rapidly with inadequate mixing, localized concentrations may occur in the reaction mixture in excess of the desired pH range. This has an adverse effect on the homogeneity of the reaction mixture and ultimately on the uniformity of the final catalyst composite. By an alternative method, the acidic sodium silicate solution may be prepared with an initial pH, say from about 3.5 to about 4.5, and the pH controlled so as not to exceed about 4.5 by adding a suitable acid separately but concurrently with the alkaline faujasite-mother liquor addition.

The acidified alkali metal silicate hereinabove referred to is available by conventional methods of preparation. The alkali metal silicate most often employed is an aqueous sodium silicate solution commercially available as "water glass." Acidification with a small amount of acid such as hydrochloric acid, sulfuric acid, and the like, effects hydrolysis of the water glass and conversion thereof to a silicic acid or a silica sol. The water glass is usually diluted with water and added to the acid in the diluted state, the final pH being at least about 2.5 and not in excess of 4.5. To obviate polymerization and premature gelation thereof, the temperature is maintained below about 100° F.

After a suitable period of time has elapsed during which the reaction mixture is permitted to age at the acidic conditions, preferably under conditions of rapid and continuous stirring, whereby the silica is polymerized to a complex polysilicic acid, the slurry is adjusted to a pH of from about 5 to about 8, preferably a pH of from about 6 to about 7. The reaction mixture is thereafter aged for a time sufficient to develop optimum pore structure of the silica hydrogel, a period of from about 0.5 to about 3 hours being suitable, a period of from about 0.5 to about 1.5 hours being preferred.

The aged product is thereafter separated from the reaction mixture and base-exchanged in contact with a solution containing an ion capable of replacing alkali metal ions, suitably an ammonium salt solution, and characterized by a pH in excess of about 4.5, so that the final catalyst composite comprises less than about 1.0 weight percent alkali metal. One convenient and preferred method comprises recovering the product as a filter cake. The filter cake is then reslurried or mixed with water to a smooth consistency and subjected to spray drying whereby the aqueous slurry is sprayed in an atomized state into an atmosphere of hot inert gases to effect a rapid evaporation of moisture so that dried particles of a predetermined size range fall out of the spray. If so desired, the aforesaid filter cake can be water-washed to concentrate and partially remove soluble salts prior to the spray drying process. Alternatively, the spray dried material can be reslurried and subjected to one or more water-washings to reduce the soluble content to an acceptable level. In any case, the aged hydrogel separated from the aforesaid reaction mixture is treated, preferably with an ammonium salt solution, to remove substantially all of the sodium or other alkali metal ions, and this last mentioned step may be combined with either or both of the aforementioned water-washing steps or may be separate and apart therefrom.

The catalyst composite prepared in accordance with the process of this invention may be composited with any of the several catalytically active metallic materials in the oxidized or reduced state. Of particular interest are the rare earth metals, e.g., cerium, lanthanum, praseodyium, neodymium, illinium, samarium, europium gadolinium, terbium, dysprosium, holmium, erbium, thulium, scandium, yttrium, lutecium, which are composited with the catalyst by base-exchange methods in the ionic form together with hydrogen ions. Thus, the catalyst composite of this invention can be further treated in contact with an aqueous solution comprising both rare earth cations and hydrogen ions, or hydrogen ion precursors such as ammonium ions. Organic and inorganic acids are generally considered as a convenient source of hydrogen ions. However, it is preferred to utilize a hydrogen ion precursor, particularly an ammonium salt such as ammonium chloride, which is decomposable to provide hydrogen ions at a temperature below the decomposition temperature of the faujasite. Anions introduced to the composite as a consequence of the base-exchange treatment are suitably separated by water-washing one or more times until free of said ions. The composite is thereafter dried generally in an air atmosphere, at an elevated temperature, a temperature of from about 150° F. to about 600° F. being suitable. Catalysts thus prepared are particularly effective in the cracking of hydrocarbon feed stocks, such as occur in the gas-oil range of petroleum hydrocarbons, to form lower boiling hydrocarbons in the motor fuel range. Catalytic cracking conditions generally described in the art apply. In particular, a temperature of from about 700° F. to about 1200° F. may be employed and the pressure may range from subatmospheric to several atmospheres. The cracking process can be effected by any of the well-known techniques including a fixed bed type of operation, a moving bed type of operation and, in particular, the well-known fluidized bed type of operation.

Also of interest are those catalysts comprising one or more metals of Group VI-B and VIII including molybdenum, tungsten, chromium, iron, nickel, cobalt, platinum, palladium, ruthenium, rhodium, osmium and iridium. Thus, the catalyst composite prepared in accordance with the process of this invention can be utilized advantageously as a catalyst or component thereof to effect a variety of hydrocarbon conversion reactions involving reaction conditions comprising a temperature in the 70–1400° F. range. The catalyst composite of this invention is particularly useful in combination with a hydrogenation component such as nickel together with molybdenum, tungsten, etc., in effecting the hydrocracking of heavy oils, including vacuum residuals, in the presence of hydrogen to form petroleum products in the middle distillate range utilizing a temperature of from about 500° F. to about 1000° F. and pressures of from about 500 p.s.i.g. to about 2500 p.s.i.g. Said hydrocarbon conversion reactions further include polymerization of olefins, particularly ethylene, propylene, 1-butene, 2-butene, iso-butylene, and also higher boiling olefins, at polymerization reaction conditions. The catalyst composite is also useful as a catalyst or a component thereof in effecting the alkylation of isoparaffins with olefins or other alkalating agents including, for example, alkyl halides and the like; and also for the alkylation of isobutane, isopentane and/or isohexane with ethylene, propylene, 1-butent, etc., or mixtures thereof; and also the alkylation of aromatics with olefins or other alkylation agents, particularly the alkylation of benzene, toluene, etc., with propylene, and higher boiling olefins including nonenes, decenes, undecenes, etc., the foregoing alkylation reactions being effected at alkylation conditions disclosed in the art. The products of the process of this invention are further helpful in the isomerization of paraffins, particularly n-butane, n-pentane, n-hexane, n-heptane, n-octane, etc., and also the isomerization of less highly branched chain saturated hydrocarbons such as the isomerization of 2- or 3-methylpentane to 2,3- and 2,2-dimethylbutane, isomerization of dimethylcyclohexane to methylcyclohexane, isomerization of methylcyclopentane to cyclohexane, etc., at isomerization reaction conditions. Other hydrocarbon conversion reactions including hydrogen transfer reactions, transalkylation reactions, and the reforming of gasoline or naphtha to improve the antiknock characteristics thereof, are effectively catalyzed utilizing the catalyst composite prepared in accordance with this method as a catalyst or component thereof.

The following example is presented in illustration of one preferred embodiment of this invention and is not intended as an undue limitation on the generally broad scope of the invention as set out in the appended claims.

In the preparation of the faujasite dispersed in its mother liquor, 49.9 pounds of sodium aluminate was dissolved in 215 pounds of a 30 weight percent sodium hydroxide solution at about 140° F. The sodium aluminate contained 31.0 weight percent $Na_2O$ and 46.0 weight percent $Al_2O_3$, and the sodium hydroxide solution contained 28.7 weight percent $Na_2O$. The resulting solution was cooled to about 100° F. and added to a rapidly stirred slurry, said slurry being an aqueous colloidal solution (159 pounds) containing 96.0 weight percent $SiO_2$ slurried in 472.6 pounds of treated water. This reaction mixture was stirred at about 100° F. for about 19 hours and then at about 203° F. for an additional hour. Thereafter, the reaction mixture was heated at about 203° F. without stirring for an additional 48 hours and then cooled to about 100° F.

An acidic sodium silicate solution was prepared by the addition of a water glass solution, containing 6.9 weight percent $SiO_2$ and a $SiO_2/Na_2O$ molar ratio of 3.22, to a 25% sulfuric acid solution, the final pH being about 3 at 95° F. The resulting solution was stirred vigorously and sufficient amount of the faujasite-mother liquor added to yield about 10 weight percent faujasite in the finished catalyst. The final pH was about 4.2–4.4. Within about 15 minutes gelation occurred and the stirring was continued for an additional 30 minutes. The pH was then adjusted to 6.0 by the addition of a 15 weight percent aqueous ammonia solution. After one hour aging at said pH the solids were separated from the supernatant liquid, reslurried in water and spray dried. The spray dried product was thereafter washed with a dilute aqueous ammonium chloride solution.

The resulting faujasite dispersed in an amorphous silica matrix was further base-exchanged with a solution comprising ammonium chloride and mixed rare earth chlorides (57.92% rare earth chloride hexahydrate). The base-exchange was accomplished over a 2 hour period whereby the catalyst composite contained about 1.5 weight percent rare earth metals. The catalyst composite was thereafter water-washed substantially free of chloride and dried at 400° F. The catalyst thus prepared was steam deactivated in preparation for testing as hereinafter described by passing 60% steam in air in contact with the catalyst at a temperature of 1400° F. for a period of 12 hours. The test consisted in passing a gas oil boiling in the range of 530–995° F. in contact with the catalyst at substantially atmospheric pressure at a feed rate of 4 weight hourly space velocity. Initial tests were run at a temperature of 930° F. to determine conversion of the gas oil to gasoline having an end point of 410° F. Thereafter, the temperature was adjusted as required to give a 57% conversion. Each test consisted of 5 cycles and each cycle consisted of a processing period, a steam stripping period and an air regeneration period. The test results are tabulated below.

° F. (required for 57% conversion) _____ 896
Gasoline, weight percent _____ 40.8
Carbon, weight percent _____ 4.7

I claim as my invention:

1. A process for manufacturing a catalytic composite of a faujasite dispersed in a silica matrix which comprises:
    (a) preparing a faujasite dispersed in its mother liquor
    (b) rapidly dispersing the faujasite-mother liquor mixture in an acidified alkali metal silicate solution having a pH in excess of about 2.5, controlling the pH during the faujasite-mother liquor addition so as not to exceed about 4.5, the final pH of the mixture in from about 4.0 to about 4.5, and effecting gelation of the mixture.
    (c) adjusting the pH of the resulting slurry to a pH of from about 5 to about 8 and aging the slurry for at least about 0.5 hour,
    (d) separating and base-exchanging the resulting solution in contact with a solution containing ions capable of replacing alkali metal ions and characterized by a pH in excess of about 4.5,
    (e) washing the base-exchanged product free of soluble matter and drying the resultant catalytic composite.

2. The process of claim 1 further characterized with respect to step (a) in that said faujasite is prepared dispersed in its mother liquor by forming a sodium-alumina-silica-water mixture whose composition expressed in terms of oxide mole ratios falls in the range $SiO_2/Al_2O_3$ from 6 to 20
$Na_2O/SiO_2$ from 0.3 to 0.7
$H_2O/Na_2O$ from 25 to 60 maintaining the mixture at a temperature of from about 65° F. to about 245° F. and forming said faujasite dispersed in its mother liquor.

3. The process of claim 2 further characterized with respect to step (b) in that said faujasite-mother liquor mixture is dispersed in an acidified alkali metal silicate solution having a pH in excess of about 2.5 and less than about 3.5, the pH being controlled during the faujasite-mother liquor addition so as not to exceed about 4.5, the final pH of the mixture being from about 4.0 to about 4.5.

4. The process of claim 3 further characterized with respect to step (b) in that said gelation is effected at a temperature of from about 70° F. to about 110° F.

5. The process of claim 4 further characterized with respect to step (c) in that said slurry is adjusted to a pH of from about 6 to about 7 and aged for a period of from about 0.5 to about 1.5 hours.

6. The process of claim 5 further characterized with respect to step (d) in that said product is base-exchanged with said solution whereby the alkali metal content is reduced to less than about 1 weight percent of said product.

References Cited
UNITED STATES PATENTS

| | | | |
|---|---|---|---|
| 3,207,701 | 9/1965 | Curtin | 252—451 |
| 3,275,571 | 9/1966 | Mattox | 252—451 |
| 3,329,627 | 7/1967 | Gladrow et al. | 252—455 X |
| 3,352,796 | 11/1967 | Kimberlin et al. | 252—455 |

DANIEL E. WYMAN, Primary Examiner

C. F. DEES, Assistant Examiner

U.S. Cl. X.R.

252—455